(12) United States Patent
Lin

(10) Patent No.: US 8,412,286 B2
(45) Date of Patent: Apr. 2, 2013

(54) TRANSCEIVER WITH POWER-SAVING FUNCTION AND THE METHOD THEREOF

(75) Inventor: Jian Ru Lin, HsinChu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1034 days.

(21) Appl. No.: 12/102,426

(22) Filed: Apr. 14, 2008

(65) Prior Publication Data
US 2008/0254842 A1    Oct. 16, 2008

(30) Foreign Application Priority Data

Apr. 14, 2007  (TW) ............................... 96113244 A

(51) Int. Cl.
*H04B 1/38* (2006.01)
(52) U.S. Cl. .................................. 455/574; 375/258
(58) Field of Classification Search ............ 455/522, 455/574, 78, 528; 375/257, 258; 327/58, 327/108; 326/30, 68, 115, 126; 370/445; 345/100, 94, 96
See application file for complete search history.

(56) References Cited

U.S. PATENT DOCUMENTS

| | | | | |
|---|---|---|---|---|
| 4,384,363 A * | 5/1983 | Lipcon | ..................... | 370/445 |
| 5,616,988 A | 4/1997 | Kim | | |
| 6,184,855 B1 * | 2/2001 | Kobayashi et al. | ........... | 345/100 |
| 6,842,037 B1 * | 1/2005 | Gradl | .............................. | 326/30 |
| 2004/0208207 A1 * | 10/2004 | Kasper et al. | ................... | 372/26 |
| 2005/0116745 A1 * | 6/2005 | Huang et al. | .................. | 327/108 |
| 2006/0220681 A1 * | 10/2006 | Wong et al. | ..................... | 326/68 |
| 2007/0116134 A1 * | 5/2007 | Schoenborn | .................. | 375/257 |
| 2007/0126480 A1 * | 6/2007 | McQuirk et al. | ................ | 327/58 |

FOREIGN PATENT DOCUMENTS

| | | |
|---|---|---|
| TW | 370753 | 9/1999 |
| TW | I255620 | 5/2006 |

* cited by examiner

*Primary Examiner* — Lana N Le
*Assistant Examiner* — Golam Sorowar
(74) *Attorney, Agent, or Firm* — McClure, Qualey & Rodack, LLP

(57) ABSTRACT

The present invention provides a transceiver with power-saving function and the method thereof, in which when the network is on link-down status, the transmitter will enter the power-saving mode, and with an auxiliary circuit to provide a comfortable common-mode voltage and to present comfortable impedance matching to save the power consumption.

16 Claims, 5 Drawing Sheets

US 8,412,286 B2

TRANSCEIVER WITH POWER-SAVING FUNCTION AND THE METHOD THEREOF

CROSS-REFERENCES TO RELATED APPLICATIONS

This non-provisional application claims priority under 35 U.S.C. §119(a) to Patent Application No(s). 096113244 filed in Taiwan, R.O.C. on Apr. 14, 2007, the entire contents of which are hereby incorporated by reference.

FIELD OF INVENTION

The present invention relates to a transceiver and the method thereof, and more specifically to a transceiver with power-saving function and the method thereof.

BACKGROUND

Because of the increasingly wider distribution of Internet, people have increased their dependence on networks accordingly. Thus, the network connection function is one of the indispensable functions for current computers.

Conventionally, referring to FIG. 1, a transformer 110 is electrically connected with a transmitter 120, such as a line driver, and a receiver 130, respectively; wherein, the transmitter not only provides the function of signal transmission, but also handles the impedance matching and the function of providing proper common mode voltage on the cable. Because the computer host must always receive a link pulse to establish the connection, the receiver 130 in the computer host must continuously supply the power. Moreover, because the common mode voltage for the signal on the cable is maintained by the transmitter 120, at this time, it must continuously supply the power to the transmitter 120, otherwise the receiver 130 cannot correctly receive the link pulse.

Furthermore, if the transmitter 120 is turned off to save the power, because the transmitter 120 has been turned off, the input common mode voltage of the receiver 130 will become 0V (volt). Thus, the received signal will be clipped, i.e. clipping, and the output of the turn-off transmitter 120 will be equivalently opened, and the impedance will become indefinite accordingly, which cannot be matched with the characteristic impedance of the cable, and further form the reflection wave. Then, the reflection wave will be mixed with the original signal, and, with the clipping, it will cause the receiver 130 to operate abnormally.

During link-down, because the transmitter 120 must still be supplied with power, the power consumption of the transmitter 120 is quite large. Therefore, the prior art cannot greatly reduce the power consumption of link down stand-by power.

SUMMARY

In view of above-mentioned problems, one of the objects of the present invention is to provide a transceiver device with power-saving function and the method thereof, so as to solve the problem disclosed in the prior art that the line drive cannot be turned off to save the power consumption.

One of the objects of the present invention is to provide a transceiver with power-saving function and the method thereof, which can save the power consumption without influencing the network signal transmission.

One of the objects of the present invention is to provide a transceiver device with power-saving function and the method thereof, which provides a common mode voltage to avoid the clipping effect.

Embodiments of present invention are directed to a transceiver, which comprises: a transmitter to transmit a transmitting signal over a transmission media; a receiver to receive a receiving signal from the transmission media; and an auxiliary circuit coupled to the receiver, to provide a common mode voltage for the transmission media when the transmitter enters a power-saving mode.

Embodiments of present invention are directed to a power-saving method applied in a transceiver comprising a transmitter, a receiver, and an auxiliary circuit, the method comprising: determining if the transceiver is coupled with a transmission media; stopping the operation of the transmitter when the transceiver is not coupled with the transmission media; and providing a common mode voltage for the transmission media through the auxiliary circuit when the transceiver is not coupled with the transmission media; wherein the power consumption of the auxiliary circuit is less than that of the transmitter.

Embodiments of present invention are directed to a power-saving method applied in a transceiver comprising a transmitter and a receiver, and an auxiliary circuit, the method comprising: disabling the transmitter when the transceiver enters a power-saving mode; and providing a common mode voltage for the transmission media through the auxiliary circuit when the transceiver enters the power-saving mode; wherein the power consumption of the auxiliary circuit is less than that of the transmitter.

Features and implementations of the present invention will be further appreciated by the detailed description for the preferred embodiments associated with the figures as follows.

DETAILED DESCRIPTION

The embodiments disclosed below are used to describe the contents of the present invention in detail, and with the figures as the auxiliary description. The symbols referred in the description are referred to the symbols in the figures.

Figure 1:
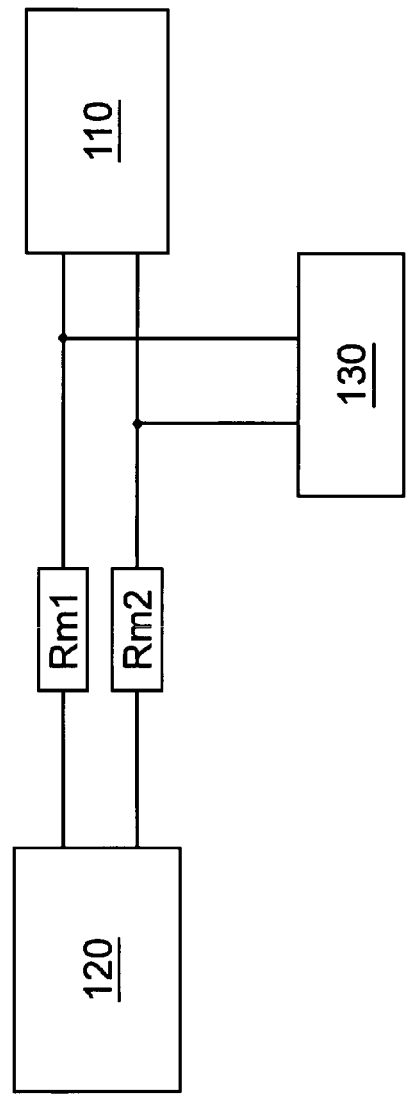
FIG. 1 is a diagram for the conventional network device.
Figure 2:
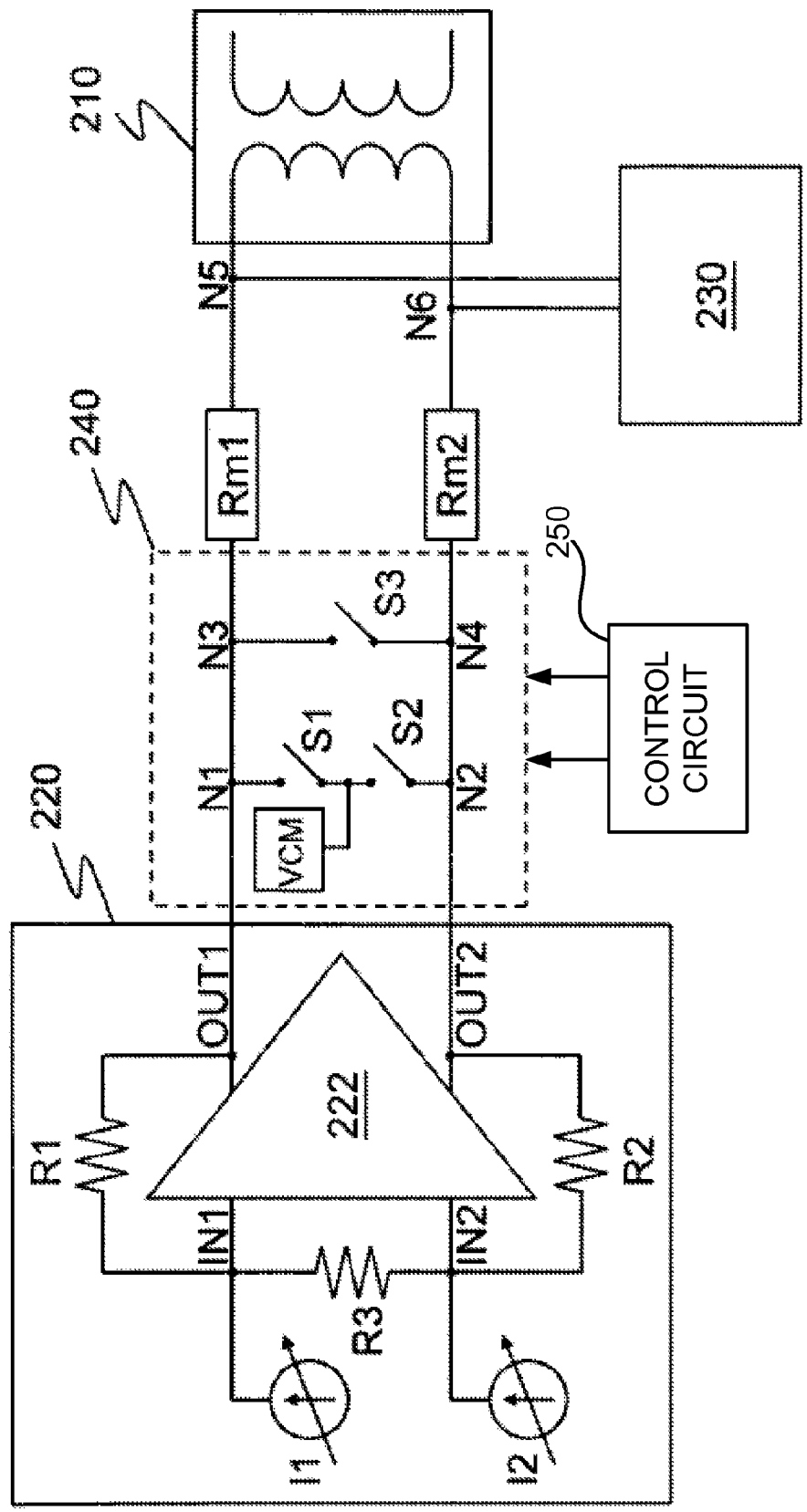
FIG. 2 is a diagram for the transceiver with power-saving function of an embodiment according to the present invention.

Referring to FIG. 2, it is a transceiver with power-saving function of an embodiment according to the present invention. The transceiver comprises a transmitter 220, a receiver 230, and an auxiliary circuit 240.

The transmitter 220 has a pair of outputs coupled to a line interface 210, such as a transformer, for transmitting a transmission signal. The receiver 230 is coupled to the line interface 210, i.e. coupled to the terminals N5, N6 for receiving a receiving signal.

In the first mode, that is, a normal mode, (i.e. the transceiver with power-saving function is connected to a line through the line interface 210 for normally transmitting or receiving packets), the transmitter 220 can transmit a transmission signal over the cable (such as CAT5 twisted-pair cable and CAT3 twisted-pair cable), and the transmitter 220 can provide the suitable common mode voltage for the cable and/or provide the function of suitable impedance matching, and the receiver 230 can also normally receive a receiving signal from the remote network device through the cable.

In the second mode, that is, a power-saving mode, (i.e. the time period between the transceiver with power-saving function being not connected to the cable and connected to the cable), the transmitter 220 is at the power-saving mode, disabled, or not supplied with power. At this time, the auxiliary circuit 240 is used to provide the suitable common mode voltage for the cable and/or provide the suitable impedance matching. Thus, when the cable is first connected, the receiver 230 can also normally detect or receive a link pulse from the remote network device through the cable. When the receiver 230 received the link pulse, it means that the cable and the transceiver with power-saving function according to the present invention have been linked together, and the transceiver according to the present invention has entered the first mode from the second mode. In a preferred embodiment, the auxiliary circuit 240 is a circuit with very small power consumption, i.e. the power consumption of the auxiliary circuit 240 is less than that of the transmitter 220.

The auxiliary circuit 240 has many applications, for example, in an embodiment, a common mode voltage generation circuit $V_{CM}$ coupled to N1, N2 of the transmitter 220 through one or more switches S1, S2 to provide the suitable common mode voltage for the cable through the common mode voltage generation circuit $V_{CM}$ and the switches S1, S2. The auxiliary circuit 240 includes a switch S3 coupled to the terminals N3, N4 of the transmitter 220 for providing suitable impedance matching through the switch S3 associated with the impedance units $R_{M1}$, $R_{M2}$. Certainly, these switches can be implemented with transistors. Also, if the impedance matching of the cable is not related to the disable/enable of the transmitter 220, the switch S3 can be omitted; similarly, if the common mode voltage of the cable is not related to the disable/enable of the transmitter 220, the common mode voltage generation circuit $V_{CM}$ and the switches S1, S2 can be omitted.

Moreover, an embodiment of the present invention further comprises a control logic circuit (not shown) for controlling the operation at the first mode or the second mode.

Figure 3A:
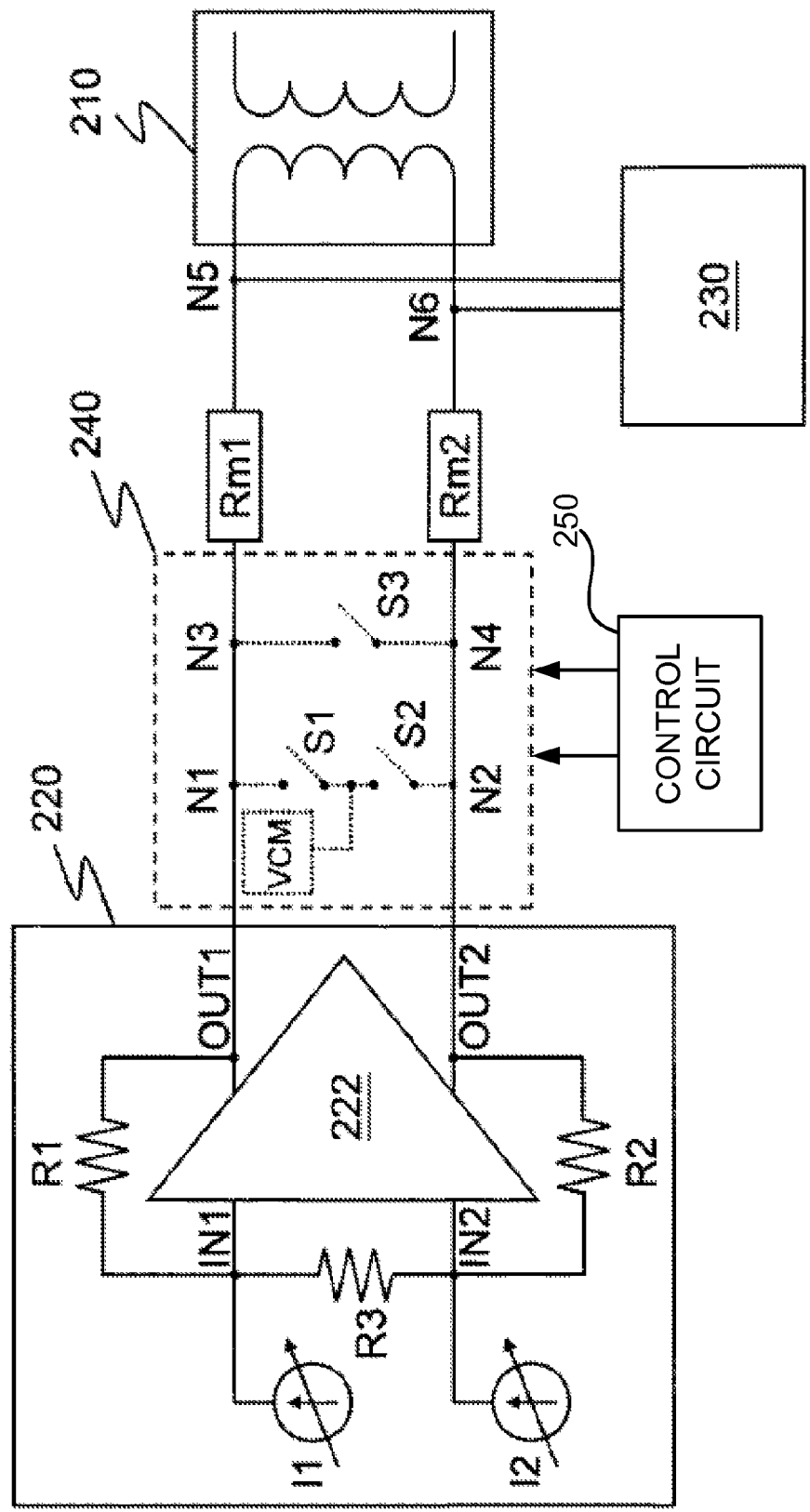
FIG. 3A is an operation diagram during network link connection.
Figure 3B:
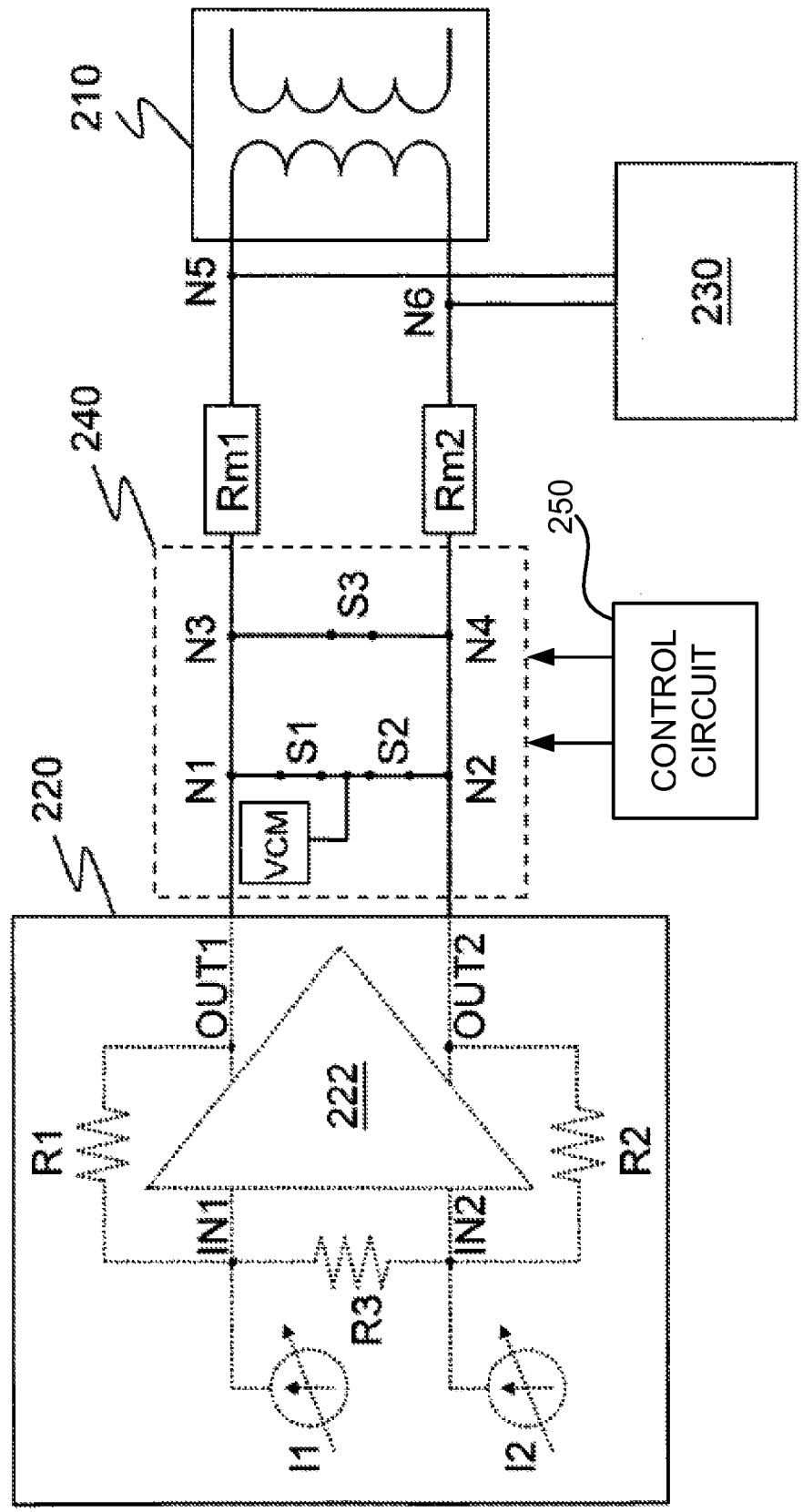
FIG. 3B is an operation diagram during network link down.

Herein, at the first mode, the switches S1, S2, S3 are off, as shown in FIG. 3A; on the contrary, at the second mode, the transceiver can enter the power-saving mode, in which the power of the transmitter 220 and the receiver 230 will be turned off, only reserve the power for the circuit, for example turning off 100/1000 M receiving module if for 10 M receiving module, in the receiver 230 regarding to the detection of the link pulse on the cable, and turn on the switch S3, so that the entire network device will enter the power-saving mode, and the receiver 230 can still detect the link pulse on the cable, as shown in FIG. 3B.

In which, the common mode voltage generation circuit $V_{CM}$ is a circuit providing a constant voltage, such as a core power source supplier or a reference voltage generator, a bandgap voltage generator, a resistance voltage divider, etc.

Referring to FIG. 2, an embodiment of a transmitter 220 comprises a different amplifier 222, the impedance units R1, R2, R3, and an adaptive current source 11, 12. Moreover, the line interface 210 may be a transformer to filter out the direct current value of a transmitting signal or a receiving signal. Also, there will be the characteristic impedance Rm1, Rm2 between the transformer, i.e. line interface 210, and the transmitter 220 to match with the effective impedance of the network cable. Herein, the transmitter 220 can be implemented with a differential amplifier. Because the transmitter 220 is well known to the skilled in the art, the description is omitted.

Figure 4:
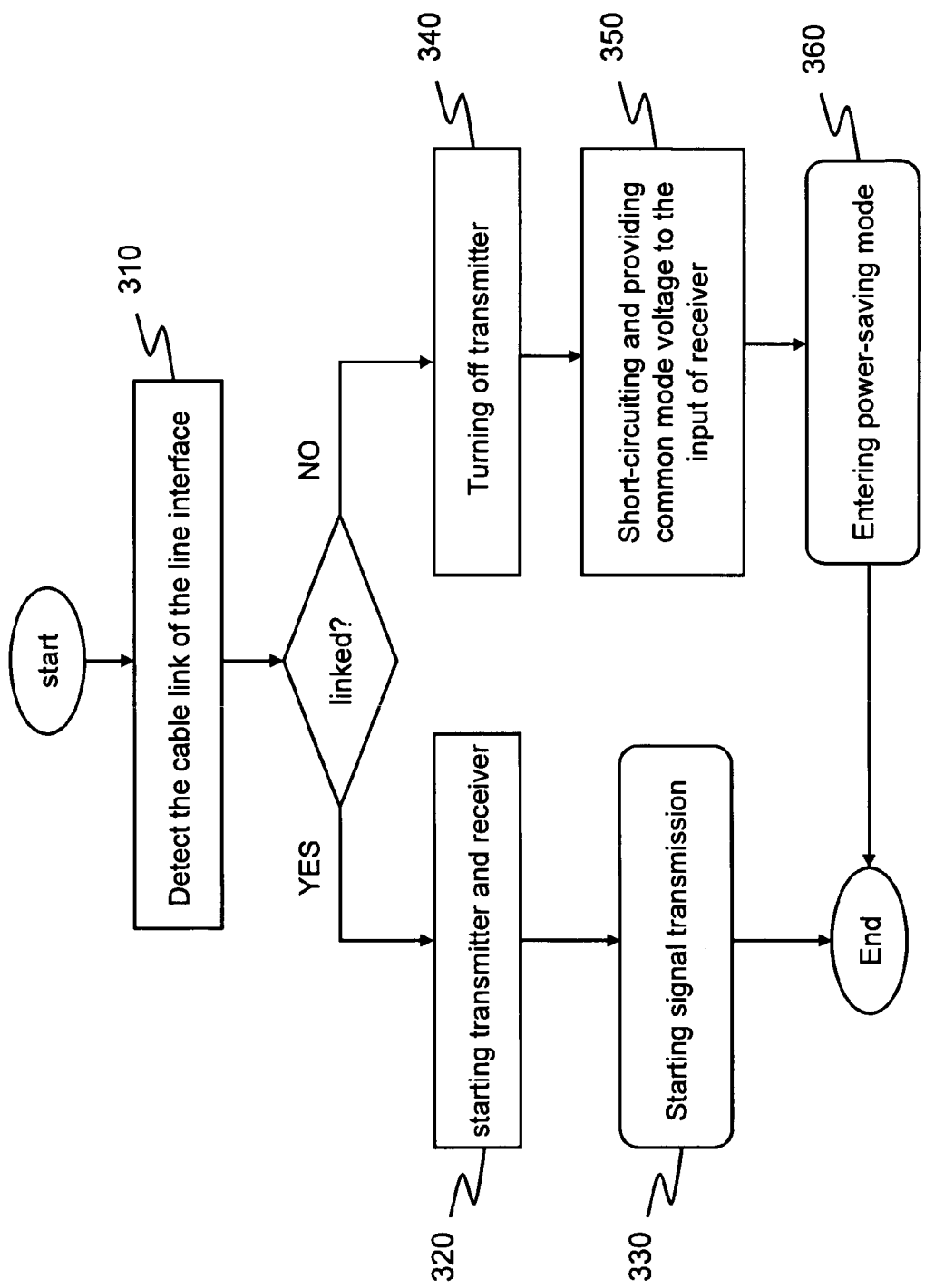
FIG. 4 is a flow chart of the power-saving method of an embodiment according to the present invention.

Referring to FIG. 4, it is a power-saving method of an embodiment according to the present invention applied in the transceiver with power-saving function. Because the related steps have been disclosed in the above-mentioned contents, persons skilled in the art will readily understand the operation and implementation of the method. Consequently, a separate detail description of this figure is not required.

In an embodiment, the transceiver with power-saving function according to the present invention is located in a network control chip. The network control chip can be implemented on various network equipments, such as network interface card (NIC), repeater, switch, hub, router, gateway, etc. In an embodiment, the transceiver with power-saving according to the present invention is compliant with at least one of the network specifications, such as 10/100 Mbps Ethernet network specification (IEEE 802.3), 1000 Gbps Ethernet network specification (IEEE 802.3ab), Virtual Local Area Network (VLAN) (IEEE 802.1Q), and the like. Based on the above-mentioned specifications, the transceiver with power-saving function according to the present invention further comprises other circuits, such as a carrier sense multiple access with collision detection (CSMA/CD) circuit for implementing the CSMA/CD function; and, a cyclic redundancy check (CRC) circuit for generating a few of fixed number of data based on the packet data, and checking the possible errors in the packet transmission. Because these circuits are well known to the skilled in the art, the descriptions are omitted. Although the present invention takes the computer network as the example, the skilled in the art should appreciate that the technical features of the present invention can be easily applied to other applications using cable transmission, for example the applications of computer and peripheral equipments, such as USB interface, 1394 interface, VGA interface and DVI interface; and, for example, the applications between a video signal generator, such as VCD/DVD compact disc drive, set-top box, etc. and a display (DTV, LCD TV, LCD monitor), which should be limited to the network.

Although the present invention has been disclosed with the above-mentioned preferred embodiments as above, they are not used to limit the present invention. The skilled in the art can make certain changes and modification without departing from the spirit and scope of the present invention. Thus, the patented protection scope of the present invention should be defined by the claims attached in the specification.

I claim:

1. A transceiver, which comprises:
   a transmitter, to transmit a transmitting signal over a transmission media;
   a receiver, to receive a receiving signal from the transmission media;
   an auxiliary circuit comprising a plurality of switches, coupled to the receiver, to selectively provide a common mode voltage for the transmission media when the transmitter is in a power-saving mode and to selectively remove the common mode voltage when the transmitter is not in the power-saving mode, wherein when the transceiver is not coupled with the transmission media, the transmitter is in the power-saving mode; and
   a control circuit configured to control the plurality of switches to control selective operation of the auxiliary circuit.

2. The transceiver of claim 1, wherein the auxiliary circuit comprises:
   a common mode voltage generator for providing the common mode voltage; and a first switch module coupled to the common mode voltage generator, wherein the first switch module is controlled by the control circuit.

3. The transceiver of claim 1, wherein the plurality of switches includes at least one switch that is selectively controllable by the control circuit to affect an impedance matching with the transmission media when the transmitter is in the power-saving mode.

4. The transceiver of claim 1, wherein when the transceiver is coupled with the transmission media, the transmitter enters a normal mode.

5. The transceiver of claim 1, wherein when the transmitter enters a normal mode, the transmitter starts to operate and the auxiliary circuit stops providing the common mode voltage for the transmission media.

6. The transceiver of claim 1, wherein the transmitter comprises:
 a differential amplifier having an output and an input; and
 a current source coupled to the input of the differential amplifier.

7. The transceiver of claim 1, wherein the transceiver is located in a network control chip and the network control chip further comprises a carrier sense multiple access with collision detection circuit for implementing the CSMA/CD function.

8. A power-saving method applied in a transceiver comprising a transmitter, a receiver, and an auxiliary circuit, the method comprising:
 determining if the transceiver is coupled with a transmission media;
 stopping the operation of the transmitter when the transceiver is not coupled with the transmission media; and
 selectively controlling a plurality of switches in the auxiliary circuit to provide a common mode voltage for the transmission media through the auxiliary circuit when the transceiver is not coupled with the transmission media, and selectively controlling the plurality of switches to remove the common mode voltage with the transceiver when the transmitter is in a normal mode;
 wherein the power consumption of the auxiliary circuit is less than that of the transmitter.

9. The method of claim 8, wherein when the transmitter enters the normal mode, and the method further comprises:
 starting the operation of the transmitter; and
 selectively controlling at least one of the plurality of switches to remove the common mode voltage through the auxiliary circuit.

10. The method of claim 8, further comprising:
 selectively controlling at least one switch of the plurality of switches to provide a short-circuit across the output of the transmitter to form an impedance matching.

11. The method of claim 10, wherein the impedance matching is the sum of two matching resistors.

12. The method of claim 8, wherein the step of providing the common mode voltage comprises:
 generating the common mode voltage; and
 turning on at least one switch of the plurality of switches to couple between the two outputs of the transmitter and to provide the common mode voltage to the transmission media.

13. A power-saving method applied in a transceiver comprising a transmitter and a receiver, and an auxiliary circuit, the method comprising:
 disabling the transmitter when the transceiver enters a power-saving mode; and
 selectively controlling a plurality of switches to provide a common mode voltage for the transmission media through the auxiliary circuit when the transceiver is in the power-saving mode;
 wherein the power consumption of the auxiliary circuit is less than that of the transmitter.

14. The method of claim 13, further comprising:
 enabling the transmitter when the transceiver enters a normal mode; and
 selectively controlling the plurality of switches to stop providing the common mode voltage for the transmission media through the auxiliary circuit when the transceiver is in the normal mode.

15. The method of claim 13, wherein the step of providing the common mode voltage comprises:
 short-circuiting the two outputs of the transmitter; and
 providing the common mode voltage into the transmission media.

16. The method of claim 13, wherein when the transceiver is not coupled with the transmission media, the transceiver enters the power-saving mode.

* * * * *